United States Patent [19]
Fall et al.

[11] 4,304,107
[45] Dec. 8, 1981

[54] SERIES SPRING TORSIONAL VIBRATION DAMPER

[75] Inventors: Don R. Fall, Oxford; Paul E. Lamarche, Utica, both of Mich.

[73] Assignee: Borg-Warner Corporation, Chicago, Ill.

[21] Appl. No.: 45,711

[22] Filed: Jun. 5, 1979

Related U.S. Application Data

[63] Continuation-in-part of Ser. No. 801,990, May 31, 1977, abandoned.

[51] Int. Cl.³ .............................................. F16D 3/14
[52] U.S. Cl. ............................... 64/27 C; 192/106.1; 192/106.2
[58] Field of Search ............... 64/27 C, 27 F, 27 CS; 192/106.1, 106.2

[56] References Cited

U.S. PATENT DOCUMENTS

| | | | |
|---|---|---|---|
| 1,830,746 | 11/1931 | Ahlene et al. | 74/574 |
| 2,571,291 | 10/1951 | Reed | 192/106.2 X |
| 2,574,573 | 11/1951 | Libby | 192/106.2 X |
| 3,327,820 | 6/1967 | Maurice | 192/106.2 X |
| 3,380,566 | 4/1968 | Cook | 192/106.2 |
| 3,762,521 | 10/1973 | Dotter | 192/106.2 |

FOREIGN PATENT DOCUMENTS

| | | | |
|---|---|---|---|
| 1032601 | 7/1958 | Fed. Rep. of Germany | 64/27 C |
| 166939 | 7/1921 | United Kingdom | 64/27 C |

*Primary Examiner*—Tony M. Argenbright
*Attorney, Agent, or Firm*—James A. Geppert

[57] ABSTRACT

A torsional vibration damper assembly for use in a torsion coupling or clutch arrangement to provide a low spring rate, high deflection amplitude characteristic. The assembly includes an input means having driving members operatively connected thereto, a hub assembly adapted to be operatively connected to an output means and including a housing containing at least one hub barrel and drive plates secured thereto, a plurality of floating spacers, and a plurality of compression spring sets which are arranged in two groups operating in parallel with the spring sets of each group operating in series.

30 Claims, 14 Drawing Figures

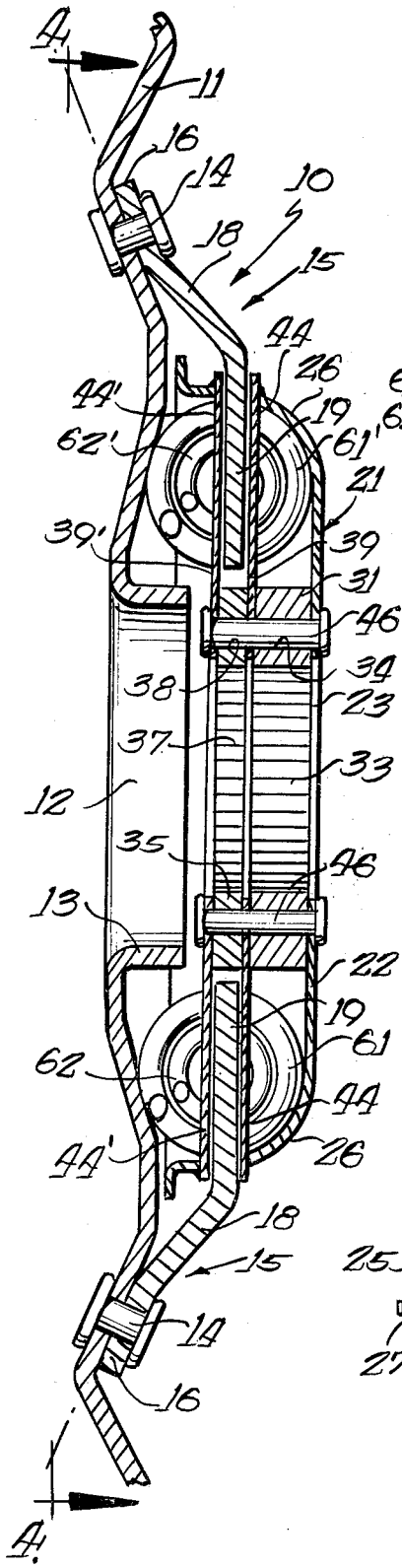
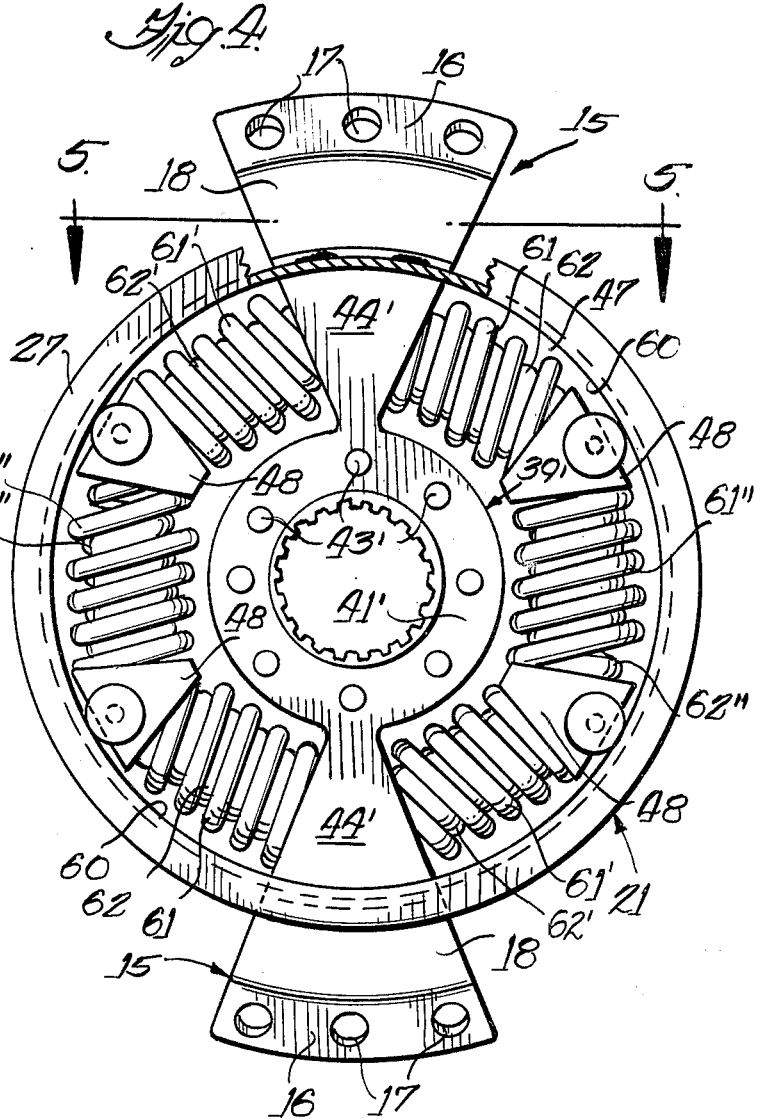
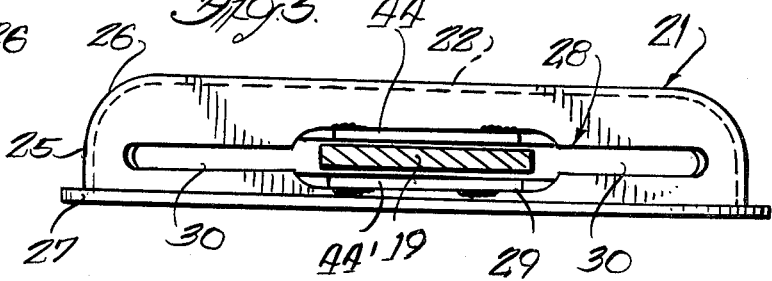

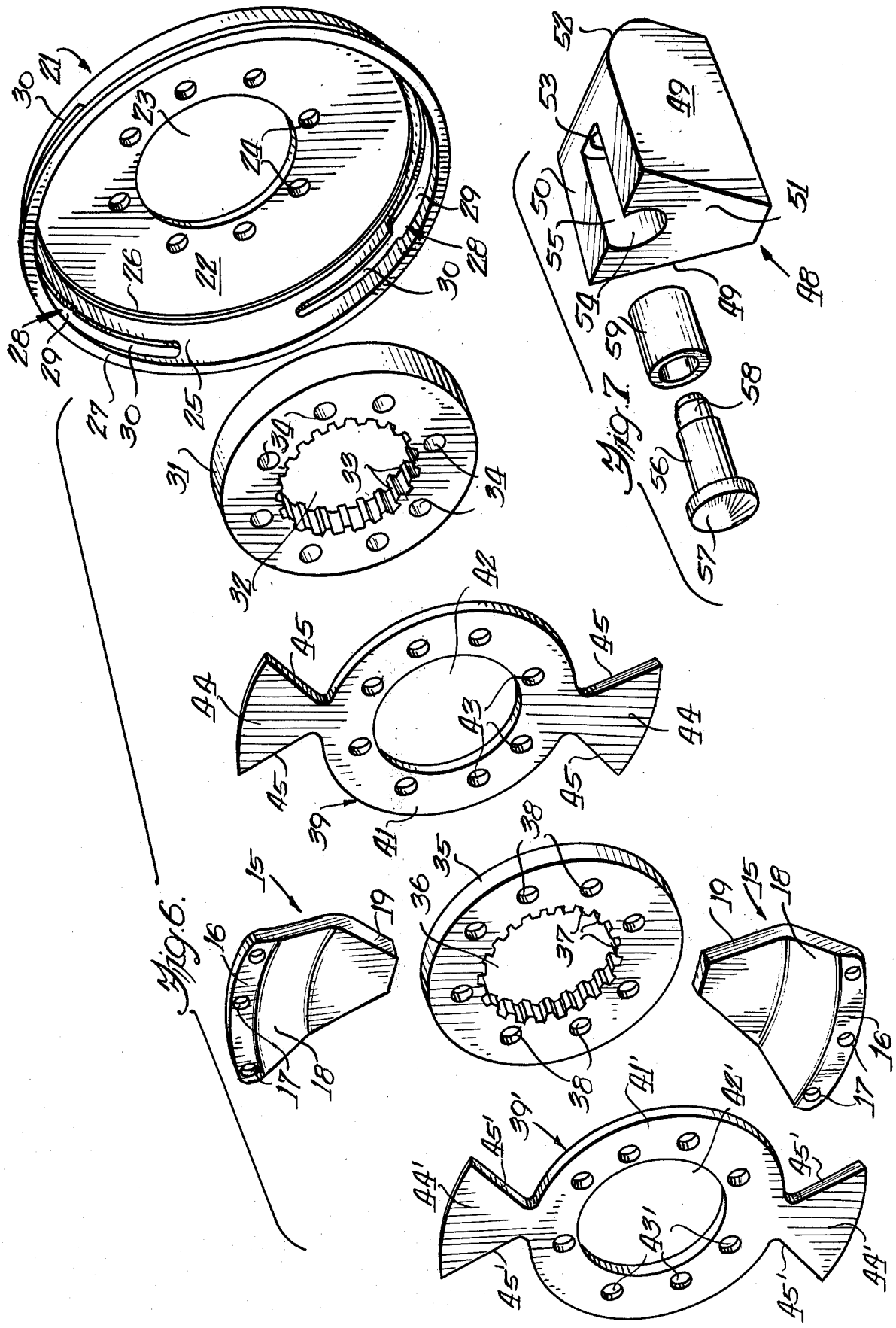

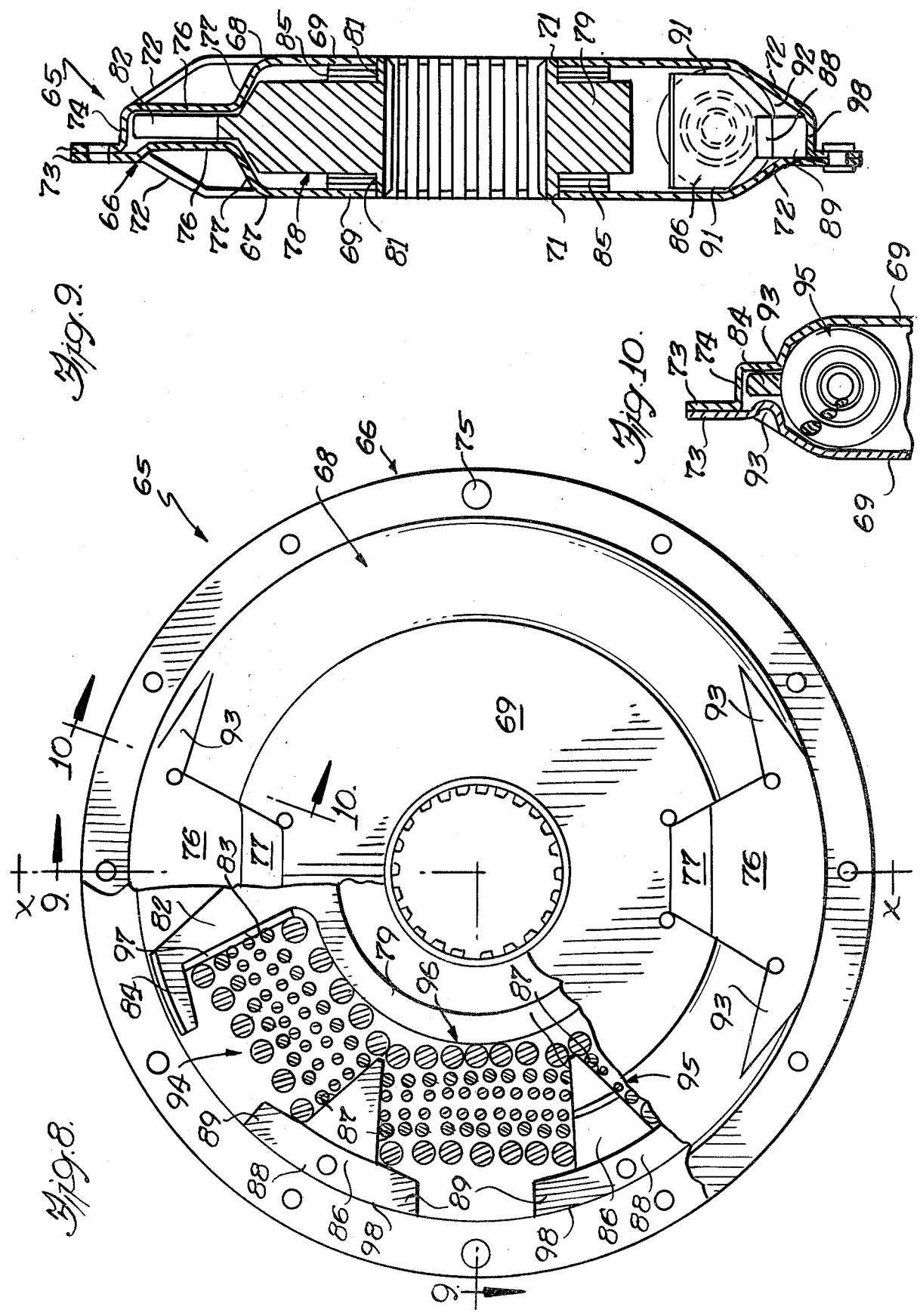

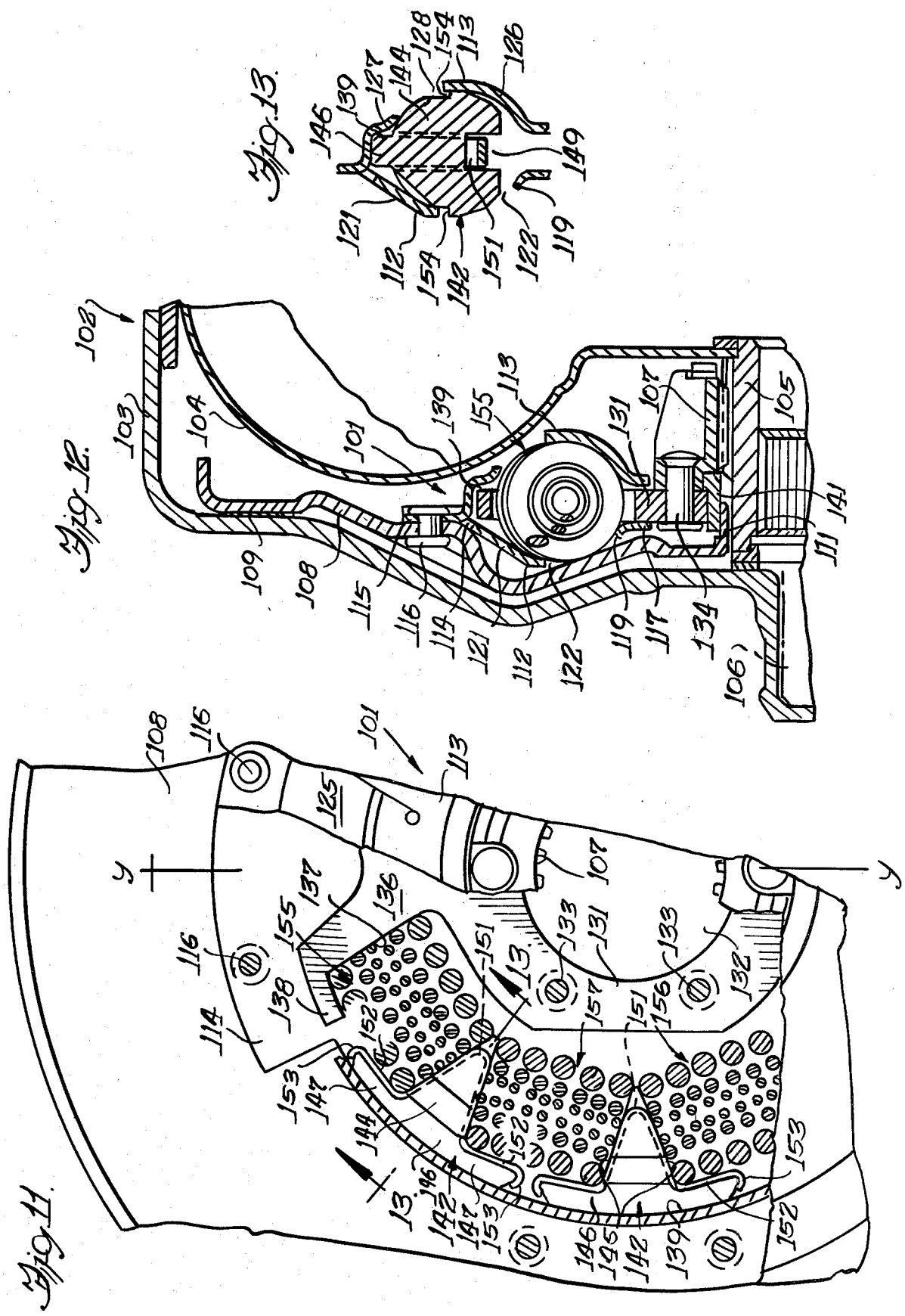

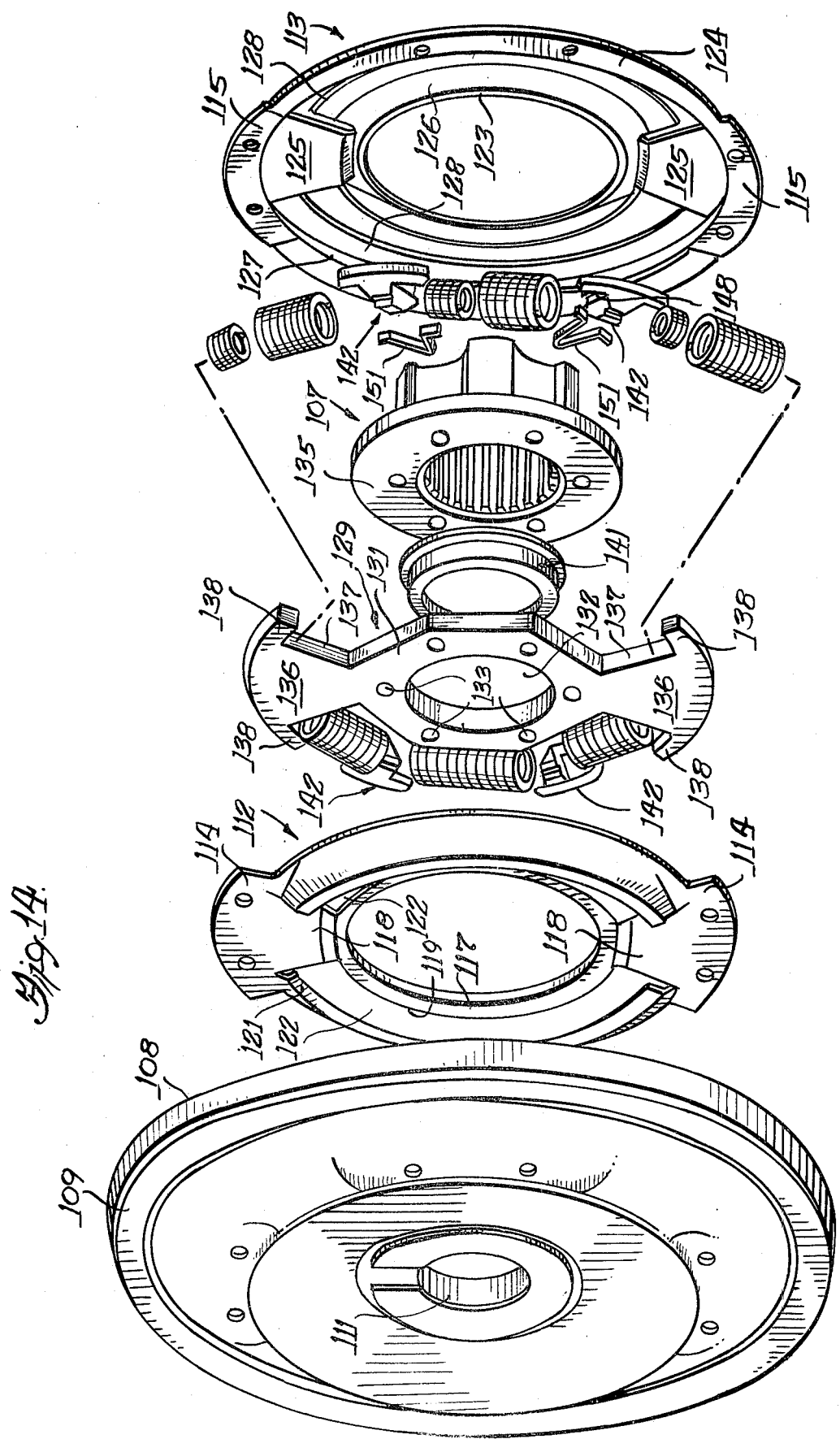

SERIES SPRING TORSIONAL VIBRATION DAMPER

CROSS REFERENCE TO RELATED APPLICATION

The present application is a continuation-in-part of application Ser. No. 801,990, filed May 31, 1977.

BACKGROUND AND SUMMARY OF THE INVENTION

The present invention relates to a torsional vibration damper assembly for use in a torsion coupling between a pair of axially aligned shafts, in a clutch for a manual transmission or in a lock-up clutch for a torque converter of an automatic transmission.

Vibration in a vehicle drive train has been a long-standing problem due to the sudden shock of engagement of the clutch disc in a vehicle clutch for a manual transmission and to the torque fluctuations occurring in an internal combustion engine. The use of a vibration damper has been long accepted as a way of counteracting these torsional vibrations from the vehicle engine which would otherwise cause undesirable characteristics, e.g., impact loads, pulsations, noises, etc., in the transmission and driveline during operation of the vehicle.

In an automatic transmission having a constant slipping device, torsional vibrations are not a problem unless a lock-up clutch is utilized to provide direct drive in order to enhance fuel economy. Without the lock-up clutch, the vibrations are absorbed hydraulically; but when the torque converter is locked in direct drive, a vibration damper is required to eliminate any disturbance resulting from torsional vibration. Likewise, the vibration damper assembly is convenient for use as a flexible coupling between an input shaft and output shaft where flexibility is required. The present invention provides a novel vibration damper assembly that will be useful in all of these various applications.

The present invention comprehends a novel vibration damper assembly which provides a relatively low rate, high amplitude deflection between the torque input and output elements. The assembly includes mounting means operatively connected to a torque input, drive members on the mounting means, a hub barrel and drive plates or arms connected together and operatively connected to the output, a plurality of floating spacers, and resilient spring means positioned in the path of the drive members, floating spacers and drive plates to provide a resilient connection between the mounting means and the hub.

The present invention also comprehends a novel vibration damper assembly providing an extended arc of deflection between the driving and driven members. The hub is secured to a dish-shaped cover plate which has a generally flat base and an annular depending flange or side. The interior surface of the flange provides a guiding surface for the floating spacers each of which contains a roller contacting the guiding surface. The resilient springs contact converging sides of the wedge-shaped spacers.

The present invention further comprehends a novel vibration damper assembly wherein the resilient springs are arranged into two groups acting in parallel, with each group comprising several spring sets of concentric springs acting in series.

The present invention also comprehends the provision of a novel vibration damper wherein the floating spacers have a narrow circumferentially extending outer flange or base received in a guide channel formed in the damper housing; the spacer having wings or tabs formed at the ends of the flange to contact the channel under the radially outward component of the spring force and centrifugal force to provide a controlled lag in the operation of the damper.

Further objects of the present invention are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a vertical cross sectional view of the vibration damper assembly taken on line 2—2 of FIG. 1.

FIG. 4 is a cross sectional view taken on the irregular line 4—4 of FIG. 2.

FIG. 5 is a cross sectional view taken on the line 5—5 of FIG. 4.

FIG. 6 is an exploded perspective view of the vibration damper without the springs and spacers.

FIG. 7 is an enlarged exploded perspective view of a floating spacer.

FIG. 8 is a rear elevational view, partially in cross section, of an alternate embodiment of damper assembly.

FIG. 9 is a cross sectional view taken on the irregular line 9—9 of FIG. 8.

FIG. 10 is a partial cross sectional view taken on the line 10—10 of FIG. 8.

FIG. 11 is a partial rear elevational view, partly in cross section of a third embodiment of damper assembly.

FIG. 12 is a partial cross sectional view taken on the line 12—12 of FIG. 11.

FIG. 13 is a partial cross sectional view taken on line 13—13 of FIG. 11.

FIG. 14 is an exploded perspective view of the damper assembly of FIG. 11.

DESCRIPTION OF THE PREFERRED EMBODIMENTS

Figure 1:
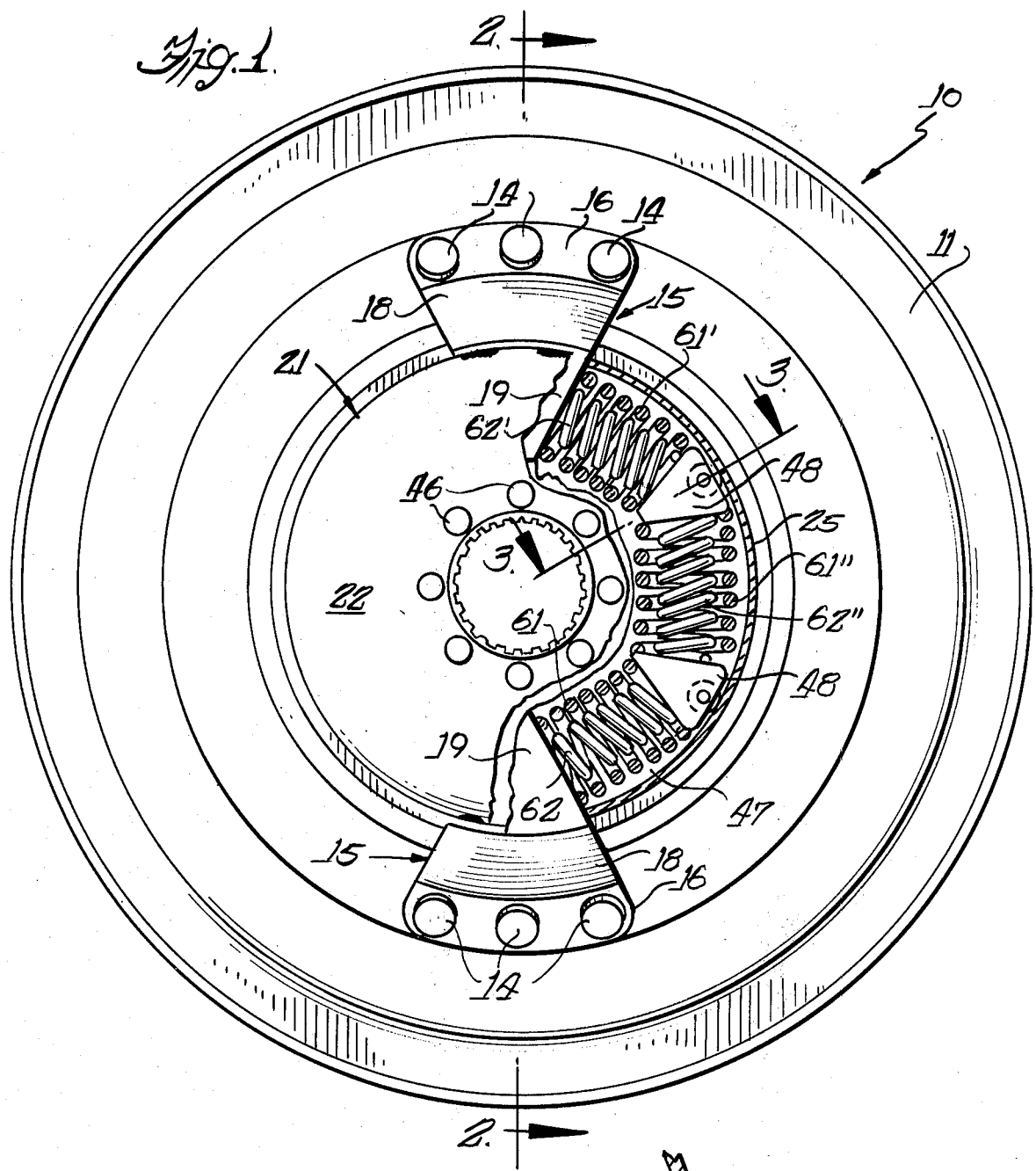
FIG. 1 is a rear elevational view, partially in cross section, of the vibration damper assembly of the present invention.

Referring more particularly to the disclosure in the drawings wherein are shown illustrative embodiments of the present invention, FIGS. 1 and 2 disclose a vibration damper assembly 10 for connection of driving and driven elements (not shown) wherein the assembly can be utilized as a flexible connection between a pair of axially aligned shafts, in a lock-up clutch in a torque converter for an automatic transmission, or in a clutch in a manual transmission. The present assembly includes a driving element 11, which may be a clutch friction plate or may be secured to a flywheel or driving flange of a shaft, having a central opening 12 defined by an annular flange 13.

Mounted on the element 11 by rivets 14 are a pair of oppositely disposed drive members 15; each member having an arcuate base 16 with openings 17 for the rivets, an angularly offset portion 18 and a generally triangular end 19 projecting into a retaining cover plate or housing 21. The cover plate 21 includes a generally flat base portion 22 having a central opening 23 and a plurality of openings 24 surrounding opening 23, and a depending skirt or flange 25 joined to the flat portion 22 by a curved portion 26 and terminating in a radially extending rim 27. A pair of oppositely elongated slots 28, 28 are formed in the flange 25 to receive the drive members 15; each slot having a central enlarged portion 29 and a narrowed extension 30 at each end of portion 29.

Within the cover plate 21 are mounted a first annular barrel hub 31 having a central opening 32 splined at 33 and a plurality of circumferentially spaced openings 34 around the central opening and a second annular barrel hub 35 also having a central opening 36 splined at 37 and circumferentially spaced openings 38 therearound. A pair of substantially identical drive plates 39 and 39' are arranged with one plate 39 located between the barrel hubs 31, 35 and the second plate 39' positioned behind the hub 35 away from the cover plate base portion 22. Each drive plate 39 or 39' includes an annular body 41 or 41' having a central opening 42 or 42', a plurality of circumferentially spaced openings 43 or 43' therearound, and a pair of oppositely disposed outwardly extending arms 44 or 44', each arm having outwardly diverging edges 45 or 45'.

A plurality of rivets 46 extend through the aligned openings 24, 34, 43, 38 and 43' of the cover plate 21, barrel hub 31, drive plate 39, barrel hub 35 and drive plate 39', respectively, to retain the parts together and form a unitary cover plate assembly. An annular space 47 is formed between the cover plate flange 25 and the barrel hubs 31, 35 to receive a plurality of damper spring spacers 48, each spacer being in the form of a generally triangular block having flat sides 49 converging away from a generally flat base 50, an inclined end 51 and a curved end surface 52 generally conformable with the curved portion 26 of the cover plate. A passage 53 extends through the block adjacent the base 50 and has a counterbored portion 54 opening into the end surface 51 and intersecting the flat base 50 to provide an elongated slot 55, as seen in FIG. 7. A shaft 56 has an enlarged head 57 at one end and a reduced shank 58 at the opposite end adapted to be received in the passage 53. A bushing 59 is rotatably mounted on the shaft 56 and is received in the counterbored portion 54 to partially extend through the slot 55.

Figure 3:
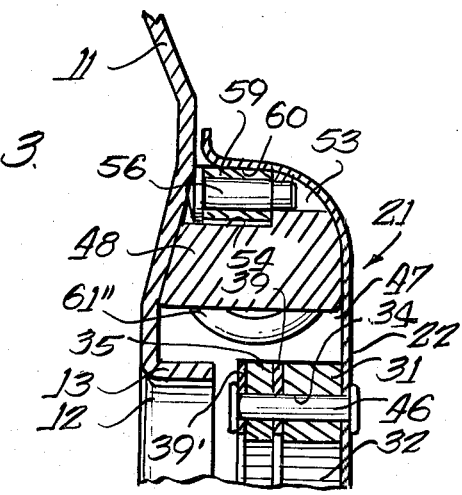
FIG. 3 is a partial cross sectional view taken on the line 3—3 of FIG. 1.

As shown in FIGS. 1, 3 and 4, the bushing 59 extends beyond the base 50 of a spacer 48 to engage the interior surface 60 of the cover plate flange 25 and provide a roller bearing action for the spacer. As seen in FIG. 1, two spacers 48, 48 are positioned between the opposite arms 44, 44' of the drive plates 39, 39' to form therewith three spring pockets to receive damper springs 61, 62; 61', 62'; and 61", 62". The springs are concentric with a pair of springs in each pocket. All three pairs of springs seen in FIG. 1 may be of the same rates or the rates of the pairs may vary depending on the desired characteristics of the damper. Although two springs are shown for each pocket, a single spring or three or more concentric springs may be utilized depending on the desired conditions of use.

FIG. 1 discloses three pairs of springs on one side of the centerline denoted as line 2—2 to form one group of springs, with a second group of springs being located on the opposite side of the centerline 2—2. The two groups of springs act in parallel and have additive loads, with the sets of springs in each group acting in series with the loads not being additive. The rates of the various pairs of springs may either be equal or have varying rates, with springs 61, 62 having the lowest rate of compression, the springs 61', 62' having an intermediate rate, and the springs 61", 62" located between the spacers 48, 48 having the highest spring rate. Identical springs are provided in the diametrically opposite pockets as shown in FIG. 4.

Considering operation of the vibration damper assembly 10, the two drive members 15 transmit torque from the driving element 11 through the springs 61, 62, 61', 62' and 61", 62" and spacers 48 to the drive plates 39, 39' and barrel hubs 31, 35; the splines 33 and 37 adapted to receive the splined end of a driven shaft (not shown) leading to a transmission or other device. As shown in FIG. 1, as the driving element 11 rotates in a counterclockwise direction, the members 15 move in the slots 28 to compress the lowest rate springs 61, 62 between the members 15 and the first spacers 48. The springs 61', 62' and 61", 62" will also be compressed but to a lesser degree as the spacers 48 move on the bushings 59 relative to the cover plate 21. As the torque is increased, the springs 61, 62 will be compressed to their solid height, with the springs 61', 62' being compressed more and springs 61", 62" yieldably transmitting torque. If both springs 61, 62 and 61', 62' are compressed to their solid heights, springs 61", 62" having the highest spring rate will still yieldably transmit torque. If the spring rates of the spring sets are identical, the application of input torque will cause compression of all springs 61, 62, 61', 62' and 61" and 62" equally. Rotation of the driving element in the clockwise direction will cause the drive members 15 to engage the springs 61', 62' and compress the spring sets.

This vibration damper assembly will provide a greater deflection angle than prior conventional damper assemblies. The angled sides 49, 49 of the spacers 48 react to the spring force causing the spacers to be urged outwardly and provide frictional contact between the bushings and the interior surface 60 of the cover plate. Although described with one arrangement of spring rates for each group, the deflection characteristic for the damper may be varied depending on the choice of springs. The damper assembly is suitable for use in a variety of automotive or industrial torsional vibration damper applications requiring a low spring rate and high deflection amplitude characteristic.

An alternative embodiment of the present invention is shown in FIGS. 8 through 10 wherein a vibration damper assembly 65 comprises a housing 66 formed of a pair of plates 67 and 68, each plate having a generally flat body 69 with a central opening 71, and an outer inclined portion 72 terminating in a peripheral flange 73; the flange of the rear plate 68 being connected by an offset portion 74. The flanges 73, 73 abut and are suitably secured together by rivets 75, which rivets also connect the housing to a suitable input means (not shown), such as friction surfaces for a clutch or a lockup clutch plate for a torque converter.

Positioned diametrically oppositely in and integral with each plate are a pair of inwardly offset drive members 76, 76 which are generally parallel and axially aligned with the members of the opposite plate. These members are connected by an offset portion 77 to the flat body 69 for a purpose to be later described. A hub 78 includes a central body portion 79 having oppositely extending shoulders 81 received in the openings 71 of the plates 67 and 68, and a pair of diametrically oppositely extending arms 82 which are generally axially aligned with and received between the parallel drive members 76. Each arm has outwardly diverging edges 83 terminating in circumferentially extending fingers 84. One or more friction washers 85 are located between the hub body 79 and the plates 67 and 68 to provide a frictional drag on relative rotation between the hub and housing.

Located between the oppositely disposed hub arms 82 are floating spacers 86; two being positioned in the housing on each side of a center line X—X through the hub arms. Each spacer 86 is in the form of a wedge having outwardly diverging walls 87 terminating in a circumferentially extending arcuate base 88 forming oppositely extending ears or wings 89; the base 88 being considerably narrower than the width of the wedge as defined by the generally parallel walls 91 in FIG. 9. The inclined portions 72 and the offset portion 74 of the housing forming a channel 92 to receive and guide movement of the base 88 of each spacer 86. Also, as seen in FIG. 10, re-entry ramps 93 are formed in the front and rear plates 67 and 68 to retain the damper springs in position and to prevent outward movement of the springs when the housing 66 moves relative to the hub arms.

Interposed between the hub arms 82 and the floating spacers 86 are spring sets 94, 95 and 96 in two groups acting in parallel on each side of the center line X—X and have additive loads. Each spring set is shown as three concentric springs, although one, two or more concentric springs may be utilized. All three spring sets may be of the same rate or the rates may vary depending on the desired damper characteristics; the highest rate spring set 96 normally being positioned between the two floating spacers. A metallic wear plate 97 is positioned on each diverging edge 83 of the hub arms to reduce wear of the arm, such as gouging caused by the springs.

Here again the angled sides or walls 87 of the spacers react to the spring force causing the spacers to be urged outwardly and provide frictional lag for the spacers as the damper operates. As the unit is actuated, both the centrifugal force and the spring angle work to apply the required lag on the winged spacer base 88 moving in the channel 92 in the housing. Also, a different material may be used as a facing on the arcuate surface 98 of the base 88 to further control lag.

FIGS. 11 through 14 disclose a further embodiment of vibration damper 101 utilized in a torque converter lock-up clutch. A conventional torque converter 102 has a cover 103 driven by a vehicle engine and secured to an impeller (not shown). A turbine 104 has a hub 105 splined to a transmission input shaft 106 and is provided with an exterior spline for connection to a damper hub member 107. A driving member 108 of an irregular cross section has an annular friction surface 109 adjacent the outer periphery and an annular flange 111 at the inner periphery encompassing the turbine hub 105.

The vibration damper 101 includes a housing formed of a pair of plates 112, 113 having mounting flanges 114, 115, respectively, secured to the driving member 108 by rivets 116. The front plate 112 includes an annular inner periphery 117 joined to the flanges 114 by drive straps 118; said plate having a short inner and inclined outer outwardly extending portions 119 and 121, respectively, defining a pair of oppositely disposed arcuate spring windows 122. The rear plate 113 also has an annular inner periphery 123 joined to an outer peripheral flange 124 having the mounting flanges 115 formed therein by oppositely extending drive straps 125. A pair of oppositely disposed outwardly rounded portions 126 extend from the inner periphery and short outwardly inclined outer portions 127 extend from the outer flange to define therebetween a pair of arcuate spring windows 128.

A hub plate 129 has a central body portion 131 with a center opening 132, a plurality of spaced openings 133 to receive suitable securing means, such as rivets 134, to connect the plate to a flange 135 of the damper hub member 107. The hub plate has a pair of oppositely disposed outwardly extending hub arms 136 having diverging edges 137 terminating in circumferentially extending fingers 138. The hub arms 136 are received between the generally parallel drive straps 118 and 125 of the plates 112 and 113, respectively, with the outer edge received in a channel 139 formed by the plates adjacent the mounting flanges 114, 115. A generally cylindrical friction washer 141 is located between the inner periphery of the hub plate 129 within the central openings 132 and the exterior surface of the flange 111 on the driving member 108.

Mounted within the housing and between the hub arms are floating spacers 142, each having a relatively wide wedge-shaped body 144 with converging surfaces 145 and a relatively narrow arcuate base portion 146 with circumferentially extending wings 147 adapted to move in the channel 139. Each diverging surface 145 have a channel 148 therein communicating with a central notch 149 formed in the narrow tip or apex of the wedge to receive a thin metal strip 151 of a generally V-shape with circumferential extensions 152 lying along the inner surface of each wing 147 and terminating in curled ends 153 bent over the ends of the wings. The strip is located on each spacer to minimize wear of the springs acting on the spacers. The side surfaces of each spacer 142 are rounded and notched at 154 to conform to the configuration of the housing plates 112 and 113.

Interposed between the hub arms 136 and the floating spacers 142 are spring sets 155, 156 and 157 arranged on both sides of a center line Y—Y to provide two groups of spring sets acting in parallel, with the spring sets of each group acting in series. Each spring set is shown as having three concentric springs, however, a single spring or two or more concentric springs could be used. As in the other embodiments, the spring sets may have equal or differing rates depending on the desired damper characteristics. This embodiment operates in the same manner as the previous embodiments, with the winged wedge acting to control the friction lag in the damper as the unit is actuated due to both the spring forces and the centrifugal force acting on each spacer.

We claim:

1. A vibration damper assembly to transmit torque between driving and driven elements, comprising an input member operatively associated with torque input means, a hub assembly operatively connected to torque output means, a housing encompassing said hub assembly, floating spacers within said housing, resilient means in said housing between said spacers, said hub assembly including a pair of oppositely disposed arms adapted to engage said resilient means, and a pair of drive members secured to said input member and extending into said housing into the path of and engaging said resilient means.

2. A vibration damper assembly as set forth in claim 1, in which said floating spacers comprise generally wedge-shaped blocks with inwardly converging sides engaged by said resilient means.

3. A vibration damper assembly as set forth in claim 1, in which said housing comprises a cover plate with a generally flat base portion and a depending skirt having a pair of elongated slots in the outer radial periphery thereof, said driving members extending through said slots into the cover plate.

4. A vibration damper assembly as set forth in claim 3, wherein said elongated slots are oppositely disposed in said cover plate, each slot having an enlarged central portion with elongated narrow end portions.

5. A vibration damper assembly as set forth in claim 3, in which said hub assembly includes at least one barrel hub and at least one drive plate secured in the cover plate, said barrel hub being splined to be operatively connected to said torque output means.

6. A vibration damper assembly as set forth in claim 5, in which said drive plate includes an annular body and a pair of oppositely extending arms, said arms extending into and secured in the elongated slots.

7. A vibration damper assembly as set forth in claim 6, in which each arm has outwardly diverging edges, and each drive member has outwardly diverging edges generally aligned with the edges on an arm, said drive members and drive plate arms being aligned when there is no torque input.

8. A vibration damper assembly as set forth in claim 3, in which said spacers comprise generally wedge-shaped blocks with inwardly converging sides, and roller means in the base of each block adapted to engage the cover plate to allow circumferential movement of said wedges.

9. A vibration damper assembly as set forth in claim 8, in which said roller means includes a shaft mounted in said block, and a bushing mounted on the shaft and partially exposed in the base of the spacer to engage said cover plate.

10. A vibration damper assembly as set forth in claim 6, in which said resilient means includes a plurality of sets of two or more concentric compression springs, said springs engaging the arms of said drive plate and said spacers, and said drive members extending through said elongated slots and adapted to engage one end of a spring set upon the exertion of torque by said input member.

11. A vibration damper assembly as set forth in claim 10, in which said springs are arranged in two groups acting in parallel, each group including three spring sets and two spacers interposed around the hub and between the oppositely extending drive plate arms.

12. A vibration damper assembly as set forth in claim 10, in which each spacer has inwardly converging sides engaged by the ends of adjacent spring sets, and said arms having inwardly converging edges engaged by said spring sets, said spring sets cooperating with said spacer sides to urge the spacers outwardly toward said cover plate skirt.

13. A vibration damper assembly as set forth in claim 12, including roller means in the base surface of each spacer adapted to engage said cover plate skirt.

14. A vibration damper assembly as set forth in claim 1, in which said housing includes a cover plate having a flat base portion and a depending skirt, said hub assembly including a pair of drive plates in said cover plate, a first hub barrel separating said drive plates, a second barrel hub separating said drive plates from said flat base portion, securing means retaining the drive plates and barrel hubs onto said cover plate, said cover plate, drive plates and barrel hubs having aligned central openings to receive the torque output means, said drive plates each having an annular body and a pair of oppositely disposed outwardly extending arms, said annular bodies and said barrel hubs being radially spaced from said skirt to provide an annular chamber divided by said arms into two substantially semi-circular chambers, said skirt having a pair of oppositely disposed elongated narrow slots, each slot having an enlarged portion receiving the ends of the arms therein, and said driving members are secured to said input member and extend into the slots between said arms.

15. A vibration damper assembly as set forth in claim 14, in which a pair of spacers are located in each semi-circular chamber, and said resilient means includes three sets of springs in each semi-circular chamber extending between said drive plate arms and said spacers, said three sets of springs forming a group.

16. A vibration damper assembly as set forth in claim 15, in which said spring groups in the semi-circular chambers act in parallel, with the springs in each group acting in series.

17. A vibration damper assembly as set forth in claim 15, in which said driving plate arms have outwardly diverging edges, and said spacers have outwardly diverging side walls terminating in a generally flat base portion, the ends of the spring sets engaging the edges of the arms and the diverging sides of said spacers to urge said spacers outwardly toward the cover plate skirt.

18. A vibration damper assembly as set forth in claim 17, in which each spacer has a roller partially exposed in the base portion and adapted to engage the skirt.

19. A vibration damper assembly as set forth in claim 18, in which said roller includes a shaft mounted in said spacer and a bushing journalled on said shaft, said spacer having a recess receiving said shaft and bushing and partially opening into said base portion to expose a portion of said bushing.

20. A vibration damper assembly as set forth in claim 17, in which said drive members have outwardly diverging edges adapted to be generally aligned with the edges of the driving plate arms when there is no torque input.

21. A vibration damper assembly as set forth in claim 20, in which an edge of each drive member engages the end of a spring set and urges it away from the adjacent drive plate arm when input torque is applied by said input member.

22. A vibration damper assembly as set forth in claim 1, in which said housing comprises a pair of plates located on the opposite sides of the hub assembly and terminating in abutting peripheral flanges secured to said input member, said drive members being formed integral with and inwardly offset in said housing plates, and said spacers comprising generally wedge-shaped blocks conformably received in said housing and having inwardly converging surfaces engaged by said resilient means.

23. A vibration damper assembly as set forth in claim 22, wherein each wedge-shaped block terminates in an outer narrow base portion providing circumferentially extending wings, and said housing plates form a channel adjacent the peripheral flanges receiving and guiding movement of said base portions.

24. A vibration damper assembly as set forth in claim 23, wherein a metal strip is received on the converging surfaces of each wedge-shaped block to be contacted by said resilient means.

25. A vibration damper assembly as set forth in claim 23, wherein the force of said resilient means acting on said inwardly converging surfaces and the centrifugal force of the rotating clutch acts to urge the wedge-shaped blocks outwardly into contact with said housing to control lag in the damper.

26. A vibration damper assembly as set forth in claim 25, wherein damper lag is applied between the winged wedge-shaped block and the channel in the housing.

27. A vibration damper assembly as set forth in claim 23, in which said hub assembly includes a hub plate having a central body portion with a pair of diametrically opposite radially extending arms having outwardly diverging edges terminating in circumferentially extending fingers, and said drive members are axially aligned with and closely parallel said hub arms.

28. A vibration damper assembly as set forth in claim 27, in which said hub arms include wear plates on the diverging edges contacted by said resilient means, and said hub body portion has a splined opening receiving said torque output means.

29. A vibration damper assembly as set forth in claim 27, wherein a hub barrel is secured to said hub plate and is operatively connected to torque output means.

30. A vibration damper assembly as set forth in claim 29, in which said torque input means includes a body portion having an inner peripheral flange extending axially within said hub plate, and an annular friction spacer between the inner periphery of the hub plate and the exterior surface of said peripheral flange.

* * * * *